US010287034B2

(12) United States Patent
Mozer

(10) Patent No.: US 10,287,034 B2
(45) Date of Patent: May 14, 2019

(54) DRONE AIRCRAFT LANDING AND DOCKING SYSTEMS

(71) Applicant: Reese A. Mozer, Pittsburgh, PA (US)

(72) Inventor: Reese A. Mozer, Pittsburgh, PA (US)

(73) Assignee: American Robotics, Inc., Marlborough, MA (US)

( * ) Notice: Subject to any disclaimer, the term of this patent is extended or adjusted under 35 U.S.C. 154(b) by 57 days.

(21) Appl. No.: 15/058,220

(22) Filed: Mar. 2, 2016

(65) Prior Publication Data

US 2016/0257426 A1 Sep. 8, 2016

Related U.S. Application Data

(60) Provisional application No. 62/126,764, filed on Mar. 2, 2015.

(51) Int. Cl.
*B64F 1/36* (2017.01)
*B64C 39/02* (2006.01)
*B64F 1/00* (2006.01)

(52) U.S. Cl.
CPC .............. *B64F 1/36* (2013.01); *B64C 39/024* (2013.01); *B64C 2201/042* (2013.01); *B64C 2201/108* (2013.01); *B64C 2201/18* (2013.01); *B64C 2201/182* (2013.01); *B64F 1/007* (2013.01)

(58) Field of Classification Search
CPC .......... B64F 1/36; B64F 1/007; B64C 2201/18
See application file for complete search history.

(56) References Cited

U.S. PATENT DOCUMENTS

| 9,387,928 | B1* | 7/2016 | Gentry | B64C 39/024 |
| 9,429,953 | B1* | 8/2016 | Miller | G05D 1/0676 |
| 9,448,562 | B1* | 9/2016 | Sirang | G05D 1/0676 |
| 9,499,265 | B2* | 11/2016 | Sanz | B64F 1/02 |
| 9,527,605 | B1* | 12/2016 | Gentry | B64F 1/12 |
| 9,573,701 | B2* | 2/2017 | Beardsley | B60L 11/1816 |
| 2016/0001883 | A1* | 1/2016 | Sanz | B64F 1/02 244/17.23 |
| 2016/0039541 | A1* | 2/2016 | Beardsley | B60L 11/1816 701/2 |
| 2016/0257423 | A1* | 9/2016 | Martin | B64F 1/00 |
| 2017/0050749 | A1* | 2/2017 | Pilskalns | B64F 1/362 |
| 2017/0253349 | A1* | 9/2017 | Wang | B64C 39/024 |

FOREIGN PATENT DOCUMENTS

WO WO-2015117216 A1 * 8/2015 ............... B64F 1/02

* cited by examiner

*Primary Examiner* — Philip J Bonzell
(74) *Attorney, Agent, or Firm* — Locke Lord LLP; Daniel J. Fiorello; Georgi Korobanov

(57) ABSTRACT

A docking station for an aircraft includes a base portion and an alignment system disposed on the base portion configured to orient the aircraft relative to the base portion. The alignment system can include a plurality of protrusions extending away from the base portion in a vertical direction. The plurality of protrusions can extend away from the base portion in both the vertical direction and a horizontal direction such that the protrusions can extend from the base portion at an angle.

15 Claims, 7 Drawing Sheets

DRONE AIRCRAFT LANDING AND DOCKING SYSTEMS

CROSS REFERENCE TO RELATED APPLICATIONS

The subject invention claims the benefit of priority from U.S. Provisional Patent Application Ser. No. 62/126,764, the disclosure of which is herein incorporated by reference in its entirety.

BACKGROUND

1. Field

The present disclosure relates to unmanned and drone aircraft, more specifically to landing and docking systems for unmanned aircraft (e.g., quad copters).

2. Description of Related Art

Quad-copters and similar aircraft can be configured to charge and/or transfer data through a suitable docking station. Such aircraft can be manually flown to and/or placed onto such a docking station for charging/data transfer. Certain types of these aircraft can be configured as autonomous drones that include software such that the drone can perform one or more functions on its own (e.g., flying a particular route, taking off, landing). These systems can employ GPS navigational mechanisms, vision sensors, distance sensors, or the like.

However, such software, sensors, and related systems inherently include positional errors that lead to misalignment of the drone relative to the docking station. Such misalignment can prevent the drone from making a physical or electromagnetic connection with the docking station, thereby preventing data transfer, object retrieval (e.g., for package delivery), and/or charging of the drone's battery without manual intervention.

Such conventional methods and systems have generally been considered satisfactory for their intended purpose. However, there is still a need in the art for improved landing and docking systems. The present disclosure provides a solution for this need.

SUMMARY

A docking station for an aircraft includes a base portion and an alignment system disposed on the base portion configured to orient the aircraft relative to the base portion. The alignment system can include a plurality of protrusions extending away from the base portion in a vertical direction. The plurality of protrusions can extend away from the base portion in both the vertical direction and a horizontal direction such that the protrusions can extend from the base portion at an angle.

The protrusions can include a wedge shape. The plurality of protrusions can include four wedge shape protrusions. The four wedge shape protrusions can be oriented to extend outwardly from a center of the base portion 90 degrees relative to each other. The wedge shape protrusions can each include a triangular plate shape.

The docking station can include a latching system operatively associated with the alignment system for selectively latching the aircraft to the docking station. The wedge shape protrusions can include at least one latch orifice for receiving a latching member of a latching system. The docking station can include the latching member extending through the latching orifice and configured to move relative to the wedge shape protrusion.

The docking station can include a charging system operatively associated with the base portion and configured to electrically couple to the aircraft to charge a battery of the aircraft. The docking station can also include a data transfer system operatively associated with the base portion and configured to communicate with the aircraft.

The docking station can be configured for use with a quad-copter such that it is a quad-copter docking station.

A method for charging and/or securing an autonomous aircraft to a docking station can include determining if the aircraft has landed in the docking station, and latching the aircraft to the docking station if the aircraft is determined to have landed in the docking station.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
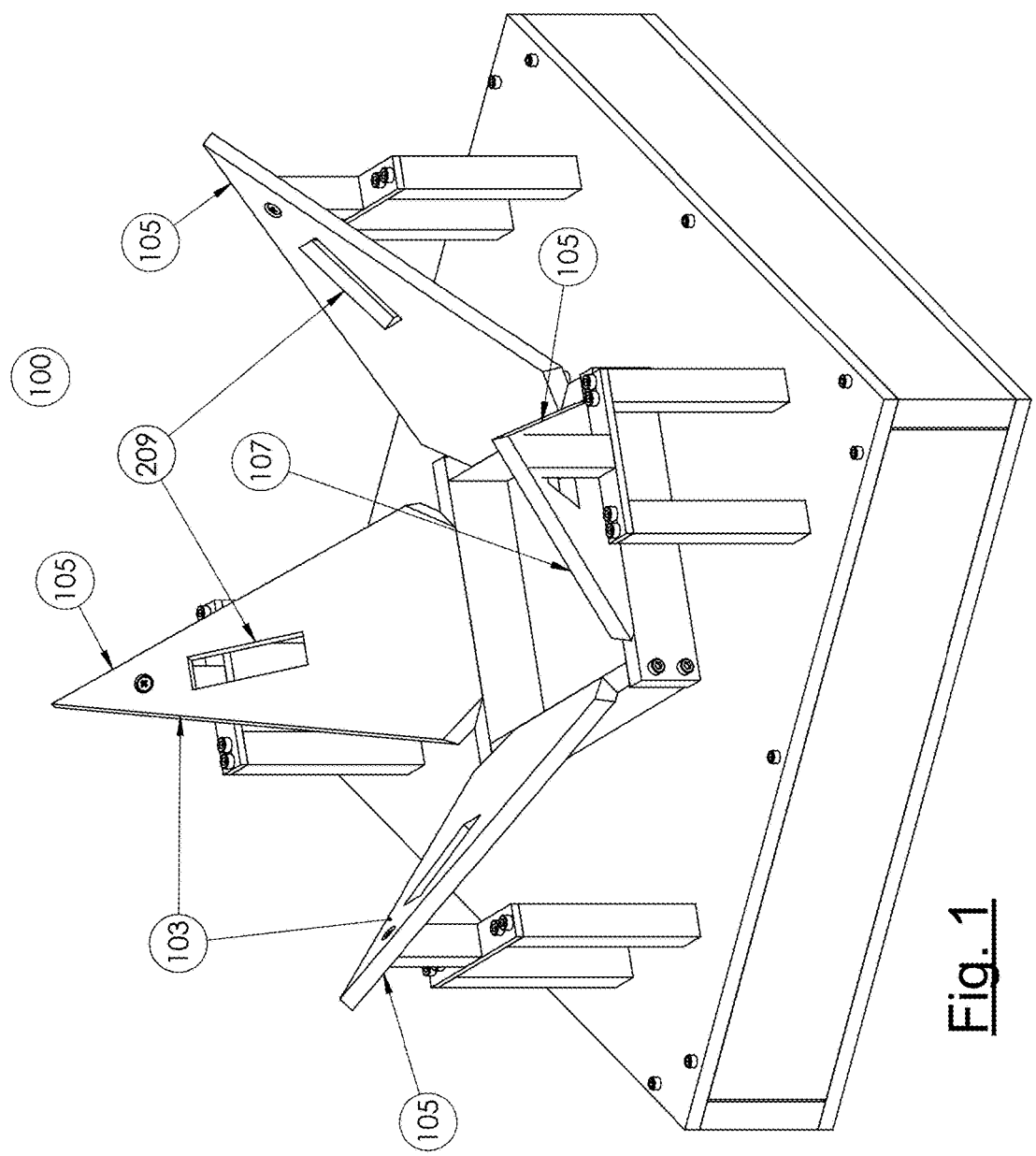
FIG. 1 is a perspective view of an embodiment of a docking station in accordance with this disclosure, showing a plurality of protrusions extending therefrom.

Reference will now be made to the drawings wherein like reference numerals identify similar structural features or aspects of the subject disclosure. For purposes of explanation and illustration, and not limitation, an illustrative view of an embodiment of a docking station in accordance with the disclosure is shown in FIG. 1 and is designated generally by reference character 100. Other embodiments and/or aspects of this disclosure are shown in FIGS. 2A-5. The systems and methods described herein can be used to improve aircraft alignment when landing at a docking station (e.g., for autonomous quad-copters or the like).

Figure 3:
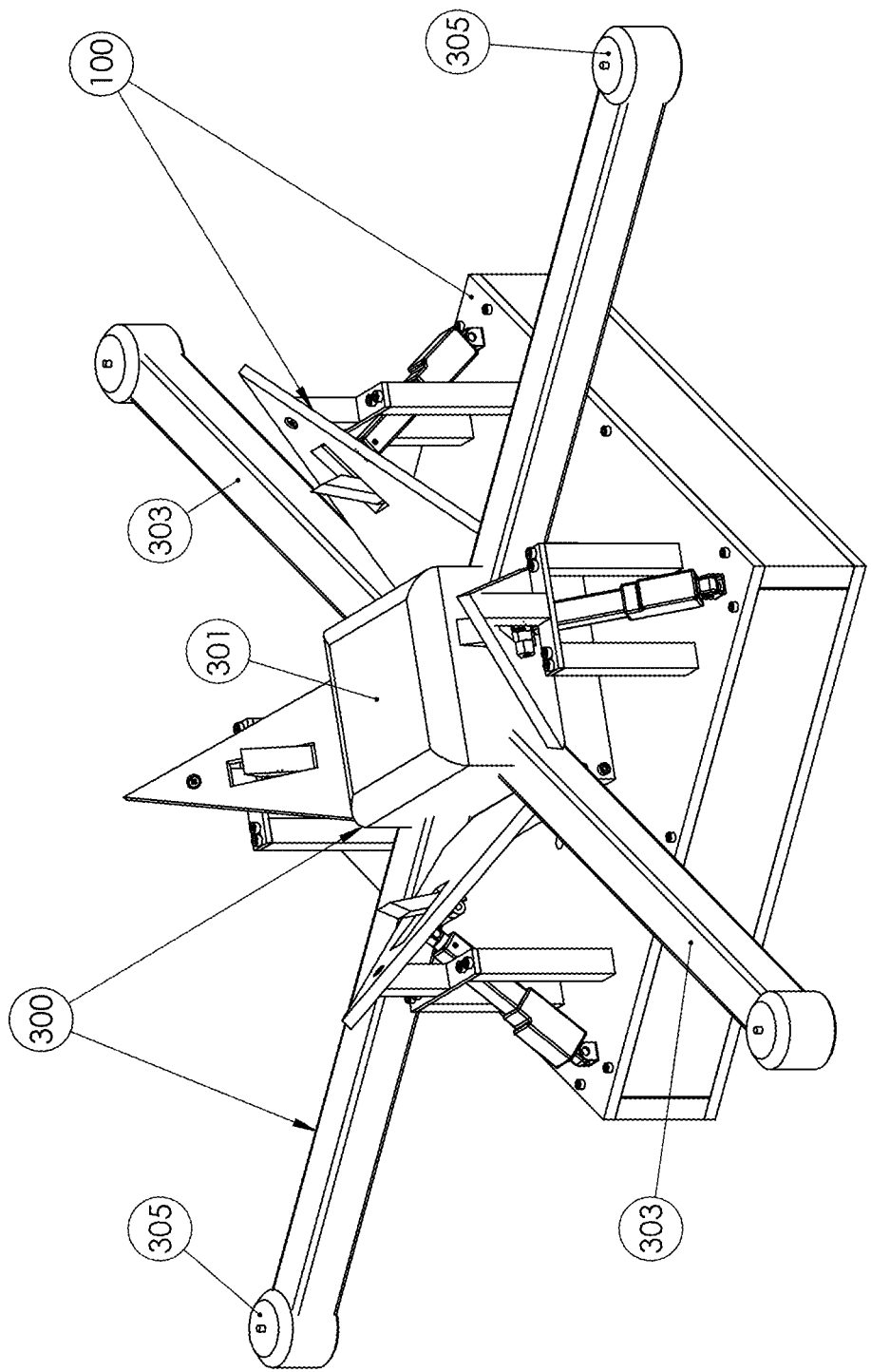
FIG. 3 is a perspective view of the docking station of FIG. 1, showing a quad-copter disposed therein.

Referring to FIGS. 1 and 3, a docking station 100 for an aircraft (e.g., quad-copter 300) includes a base portion 101 and an alignment system 103 disposed on the base portion 101. The alignment system 103 is configured to orient the aircraft relative to the base portion 103, for example, to facilitate coordinated landing on the base portion 101. This can allow for aircraft (e.g., unmanned and/or autonomous aircraft) to properly land on a docking station 100 in a predetermined orientation and/or position so that the aircraft can receive energy and/or data from through the docking station 100.

The alignment system 103 can include a plurality of protrusions 105 extending away from the base portion 101 in at least a vertical direction. As shown, the plurality of protrusions 105 can extend away from the base portion 101 in both the vertical direction and a horizontal direction such that the protrusions 105 can extend from the base portion 101 at a non-right angle. The angle at which protrusions 105 extend can be the same for each or different for one or more protrusions 105.

At least one of the protrusions 105 can include a wedge shape. As shown, the docking station 100 can include four wedge shape protrusions 105 configured for guiding a quad copter. The four protrusions 105 can be oriented to extend outwardly from a center 107 of the base portion 101 at about 90 degrees relative to each other. It is contemplated that the docking station 100 can be configured to have less than four protrusions (e.g., for a tri-copter) or more than four protrusions (e.g., for a hexacopter, octocopter, or any other suitable multi-rotor craft). Generally, any suitable number of protrusions 105 is contemplated herein and each protrusion 105 can be placed at $360/N_p$ degrees relative to each other, where $N_p$ is the total number of protrusions 105.

As shown, the wedge shaped protrusions 105 can be defined by a triangular plate shape or any other suitable shape that allows the aircraft to be medialised to the center 107 of the docking station 100. The protrusions 105 can have any suitable angle with a sufficient vertical component to overcome frictional and/or other resistance forces of from the aircraft to allow the aircraft to slide on the protrusions 105 toward the center 107.

Figure 2A:
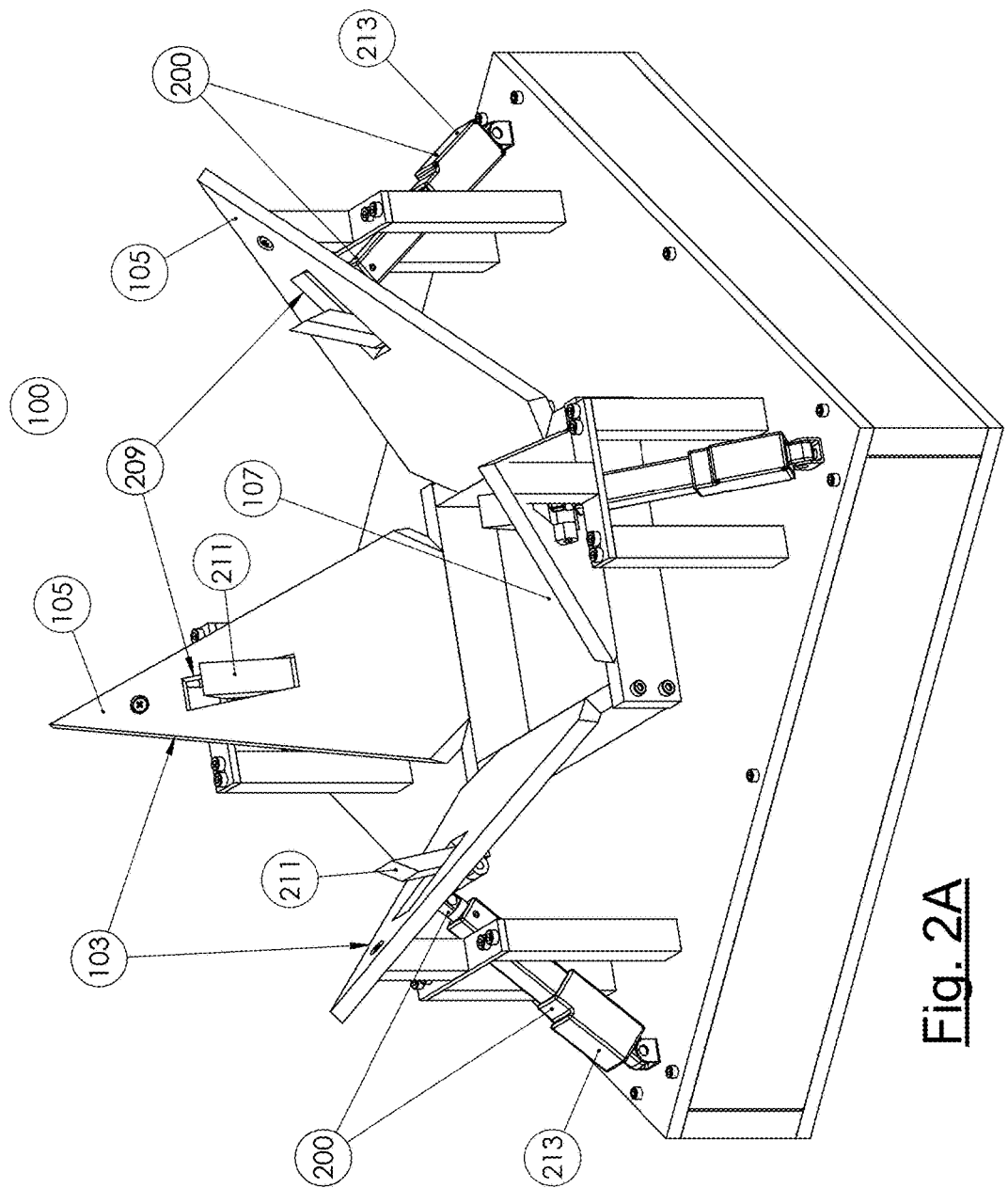
FIG. 2A is a perspective view of the docking station of FIG. 1, showing a locking system operatively disposed thereon.
Figure 2B:
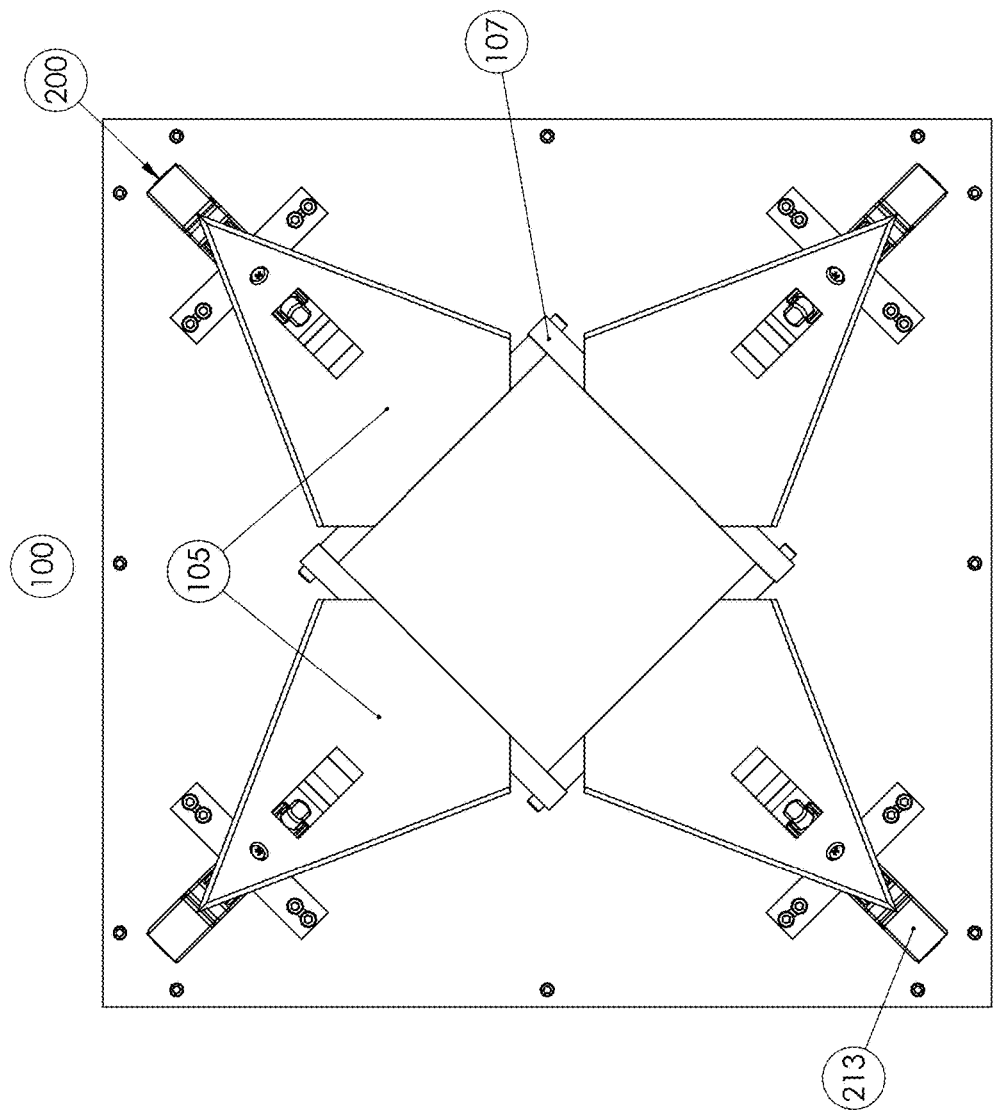
FIG. 2B is a plan view of the docking station of FIG. 2A.
Figure 2C:
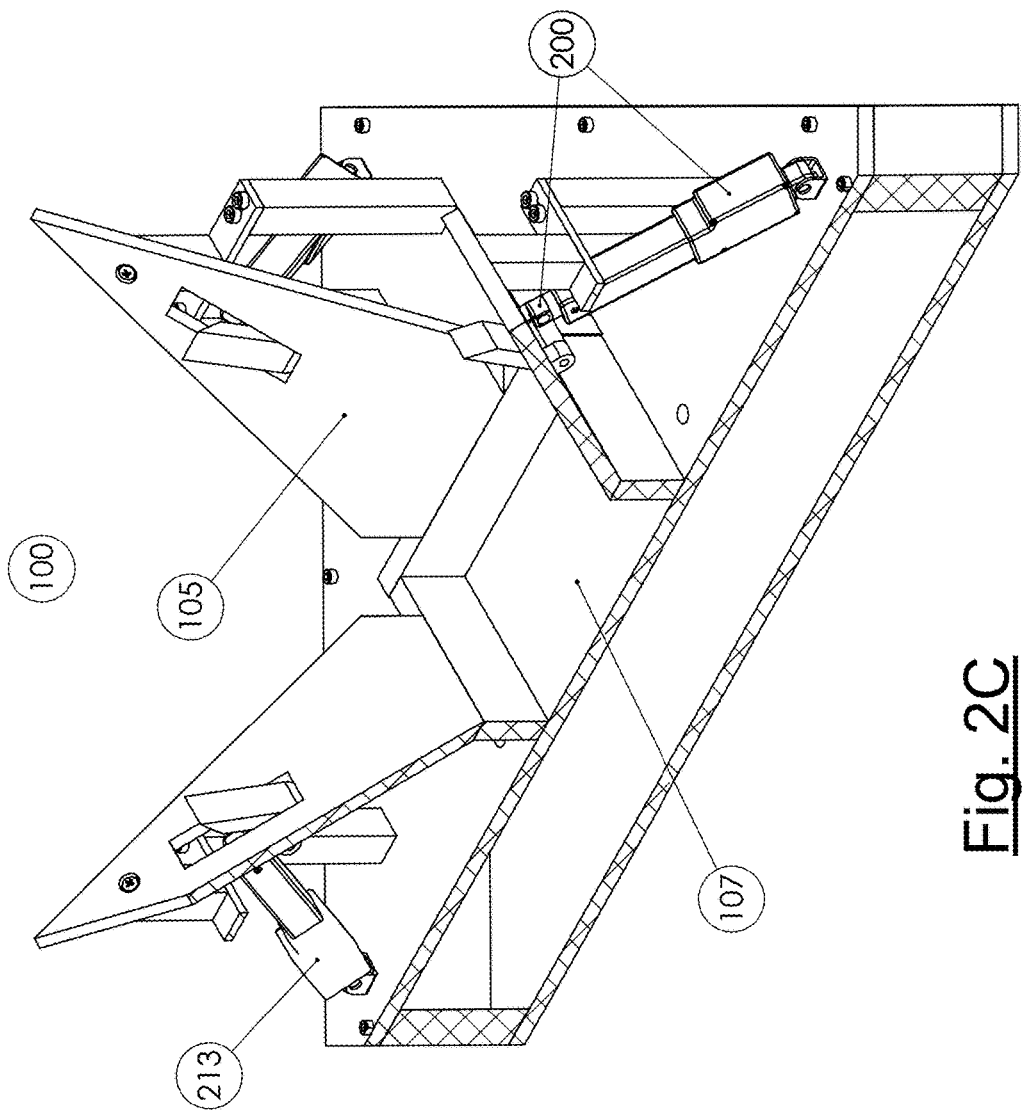
FIG. 2C is a perspective cross-sectional view of the docking station of FIG. 2A.

Referring to FIGS. 2A-2C, the docking station 100 can include a latching system 200 operatively associated with the alignment system 103 for selectively latching the aircraft to the docking station 100. For example, the protrusions 105 can include at least one latch orifice 209 for receiving a latching member 211 of a latching system 200.

Figure 4:
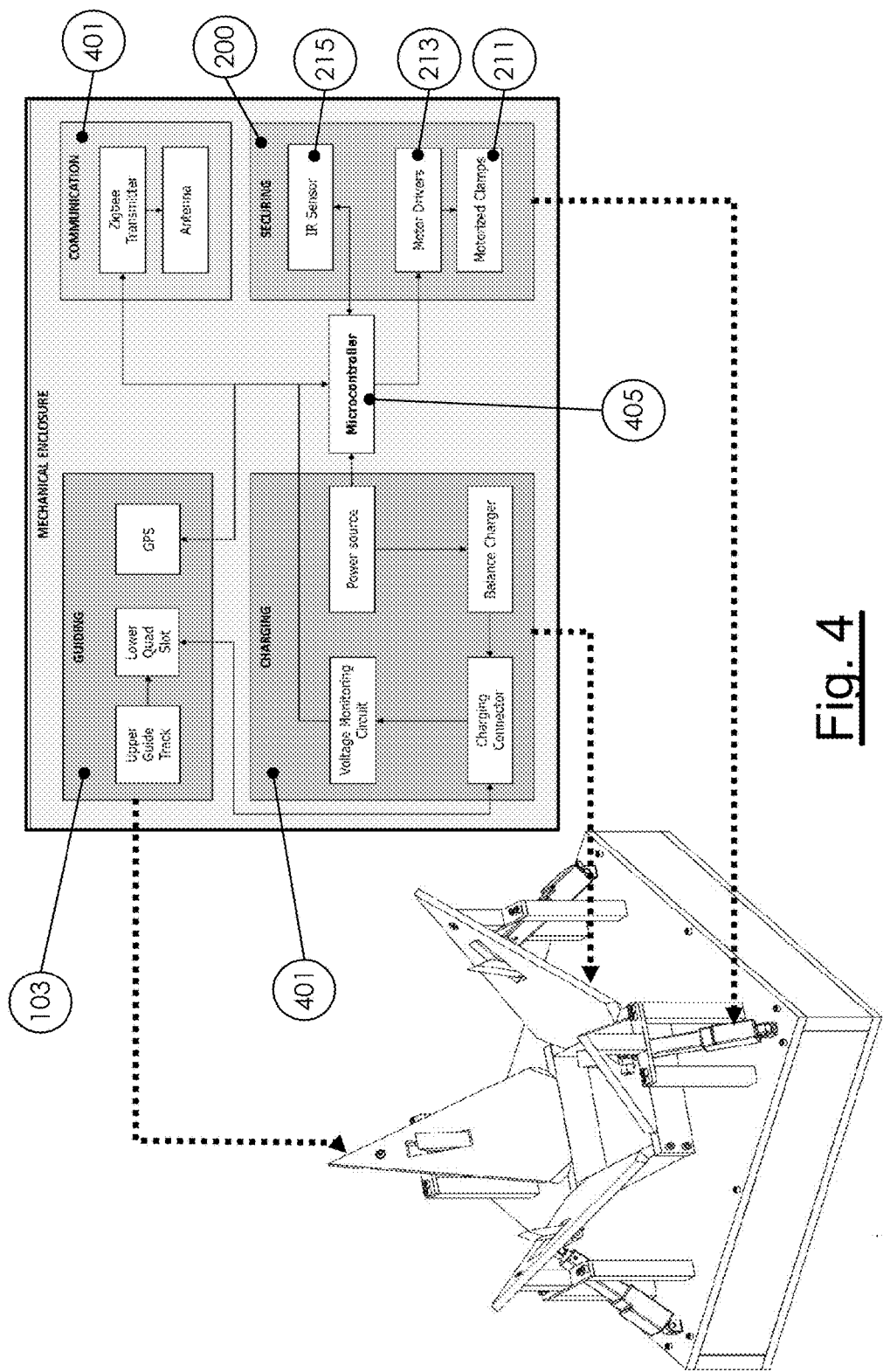
FIG. 4 is a schematic of an embodiment of system internals of the docking station of FIG. 2A.
Figure 5:
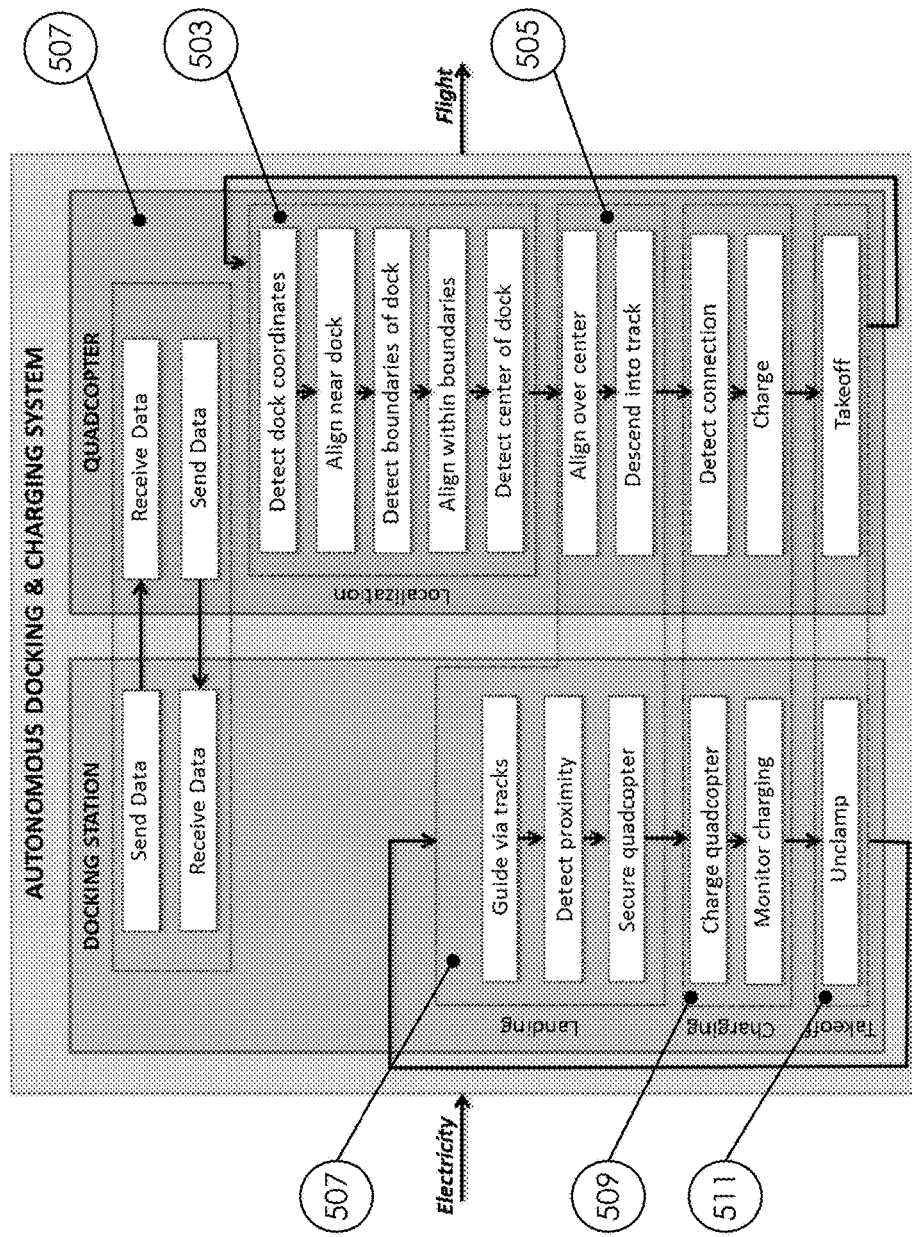
FIG. 5 is a schematic of an embodiment of algorithmic architecture of the docking system and an aircraft relative to each other.

The latching member 211 can extend through the latching orifice 209 and be configured to move relative to the protrusion 105. The latching member 211 can be actuated by any suitable motor or other mechanism (e.g., piston member 213) to extend toward the center 107 and hold the aircraft to the docking station 100. Referring to FIG. 4, the latching system 200 can include a sensor 215 in communication with a controller 405 configured to sense when the aircraft is present in the docking station 100.

With continued reference to FIG. 4, the docking station 100 can include a charging system 401 operatively associated with the base portion 101 and configured to electrically couple to the aircraft to charge a battery of the aircraft. For example, the charging system 410 can include an inductive charger or any other suitable charger with contact terminals. The docking station 100 can also include a data transfer system 403 operatively associated with the base portion 101 and configured to communicate with the aircraft via any suitable connection (e.g., an antenna, a wired connection). It is also contemplated that an object retrieval system (not shown) can be included to retrieve or add packages or other payload from the aircraft. These components can be disposed in the center 107 or any other suitable portion of the docking station 100 (e.g., base 101).

As described above, the docking station can be configured for use with a quad-copter 300 (e.g., an autonomous quad-copter) such that it is a quad-copter docking station. For example, quad-copter 300 can include a body portion 301 and four arms 303 extending therefrom, each arm 303 configured to hold a motor 305 and propeller (not shown) for lifting and controlling the quad-copter 300.

During landing, the quad-copter 300 positions itself or is positioned by a user over the docking station imperfectly due to inherent errors in the precision of autonomous navigation and/or control software and/or or manual user error. Also, the orientation of the arms 303 relative to the docking station 100 can be misaligned. When descending toward the docking station 100 when out of alignment with the center 107, the arms 303 and/or the body 101 contact the protrusions 105 and are directed toward the center 107. If the arms 303 are out of alignment, the quad-copter 300 will also be rotated as it descends. When the quad-copter reaches its lowest point at the center 107, it can be put into communication with the charging system 401 and/or data transfer system 403 by being medialised and/or oriented properly. The locking system 200 can then selectively retain the quad-copter 200 to the docking station 100 according to any predetermined criteria or algorithm.

A method for charging and/or securing an autonomous aircraft to a docking station 100 can include determining if the aircraft has landed in the docking station 100, and latching the aircraft to the docking station 100 if the aircraft is determined to have landed in the docking station 100. In an autonomous example, referring to FIG. 5, when flying or during any other suitable operation, the docking station 100 and the quad-copter 300 can communicate with each other via one or more embodiments of a communication subroutine 501. When the quad-copter 300 software decides to land at the docking station 100, the quad-copter can be configured to execute one or more embodiments of a localization subroutine 503 and attempt to align with the center 107 of the docking station 100. In one or more embodiments of a landing subroutine 505, the quad-copter 300 can descend into the docking station 100/alignment system 103 after attempting to align itself using its own navigation (e.g., GPS).

The docking station 100 can execute one or more embodiments of a docking subroutine 507 to detect when the quad-copter 300 has descended into the docking station 100. After the quad-copter 300 has landed, the quad-copter 300 and/or the docking station can execute one or more embodiments of a charging subroutine 509 (e.g., to detect a suitable electrical coupling and/or to monitor charging) and/or to transfer data. After suitable charging/data transfer, the docking station 100 and the quad-copter 300 can execute one or more embodiments of a take-off subroutine 511 (e.g., the docking station 100 can release locking system 200 and allow the quad-copter 300 to take off).

The methods and systems of the present disclosure, as described above and shown in the drawings, provide for aircraft docking stations with superior properties including alignment systems for guiding aircraft into the docking stations. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A docking station for an aircraft, comprising:
   a base portion;
   an alignment system disposed on the base portion configured to orient the aircraft relative to the base portion; and
   a latching system operatively associated with the alignment system for selectively latching the aircraft to the docking station, wherein the alignment system includes a plurality of protrusions, wherein the protrusions include at least one latch orifice for receiving a latching member of the latching system, wherein the latching system includes the latching member extending through the latching orifice and configured to move relative to the protrusion.

2. The docking station of claim 1, further including a charging system operatively associated with the base portion and configured to electrically couple to the aircraft to charge a battery of the aircraft.

3. The docking station of claim 1, further including a data transfer system operatively associated with the base portion and configured to communicate with the aircraft.

4. The docking station of claim 1, wherein the plurality of protrusions extending away from the base portion in a vertical direction.

5. The docking station of claim 4, wherein the plurality of protrusions extend away from the base portion in both the vertical direction and a horizontal direction such that the protrusions extend from the base portion at an angle.

6. The docking station of claim 5, wherein the protrusions include a wedge shape.

7. The docking station of claim 6, wherein the plurality of protrusions includes four wedge shape protrusions.

8. The docking station of claim 7, wherein the four wedge shape protrusions are oriented to extend outwardly from a center of the base portion 90 degrees relative to each other.

9. The docking station of claim 8, wherein the wedge shape protrusions each include a triangular plate shape.

10. A quad-copter docking station, comprising:
a base portion; and
an alignment system disposed on the base portion configured to orient the aircraft relative to the base portion, wherein the alignment system includes a plurality of protrusions extending away from the base portion in both the vertical direction and a horizontal direction such that the protrusions extend from the base portion at an angle; and
a latching system operatively associated with the alignment system for selectively latching the aircraft to the docking station, wherein the protrusions include at least one latch orifice for receiving a latching member of the latching system, wherein the latching system includes the latching member extending through the latching orifice and configured to move relative to the protrusion.

11. The docking station of claim 10, wherein the protrusions include a wedge shape.

12. The docking station of claim 11, wherein the plurality of protrusions includes four wedge shape protrusions.

13. The docking station of claim 12, wherein the four wedge shape protrusions are oriented to extend outwardly from a center of the base portion 90 degrees relative to each other.

14. The docking station of claim 13, wherein the wedge shape protrusions include a triangular plate shape.

15. A method for charging and/or securing an autonomous aircraft to a docking station, comprising:
determining if the aircraft has landed in the docking station, wherein the docking station includes:
a base portion; and
an alignment system disposed on the base portion configured to orient the aircraft relative to the base portion, wherein the alignment system includes a plurality of protrusions extending away from the base portion in both the vertical direction and a horizontal direction such that the protrusions extend from the base portion at an angle; and
a latching system operatively associated with the alignment system for selectively latching the aircraft to the docking station, wherein the protrusions include at least one latch orifice for receiving a latching member of the latching system, wherein the latching system includes the latching member extending through the latching orifice and configured to move relative to the protrusion; and
latching the aircraft to the docking station if the aircraft is determined to have landed in the docking station using the latching system.

* * * * *